United States Patent
Lin et al.

(10) Patent No.: US 11,377,532 B2
(45) Date of Patent: Jul. 5, 2022

(54) APPROACH TO HEAT EXPANDABLE MATERIALS

(71) Applicant: SIKA TECHNOLOGY AG, Baar (CH)

(72) Inventors: Geng Lin, Rochester Hills, MI (US); Leslie Wolschleger, Clarkston, MI (US); Nicolae Bordeanu, Rochester Hills, MI (US)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 16/316,017

(22) PCT Filed: Jul. 19, 2017

(86) PCT No.: PCT/EP2017/068282
§ 371 (c)(1),
(2) Date: Jan. 7, 2019

(87) PCT Pub. No.: WO2018/015461
PCT Pub. Date: Jan. 25, 2018

(65) Prior Publication Data
US 2019/0276624 A1 Sep. 12, 2019

(30) Foreign Application Priority Data
Jul. 20, 2016 (EP) .................................... 16180389

(51) Int. Cl.
| | |
|---|---|
| *C08J 9/10* | (2006.01) |
| *C08J 9/08* | (2006.01) |
| *C08L 63/00* | (2006.01) |
| *C08J 9/00* | (2006.01) |
| *B29C 44/02* | (2006.01) |
| *C08G 59/24* | (2006.01) |
| *C08L 23/08* | (2006.01) |
| *B29K 63/00* | (2006.01) |
| *C08G 101/00* | (2006.01) |

(52) U.S. Cl.
CPC ............ *C08J 9/0061* (2013.01); *B29C 44/02* (2013.01); *C08G 59/245* (2013.01); *C08J 9/08* (2013.01); *C08J 9/103* (2013.01); *C08J 9/107* (2013.01); *C08L 23/0884* (2013.01); *C08L 63/00* (2013.01); *B29K 2063/00* (2013.01); *C08G 2101/00* (2013.01); *C08J 2201/03* (2013.01); *C08J 2203/02* (2013.01); *C08J 2203/04* (2013.01); *C08J 2323/08* (2013.01); *C08J 2363/00* (2013.01); *C08J 2363/02* (2013.01); *C08J 2375/04* (2013.01); *C08J 2423/08* (2013.01); *C08L 2203/14* (2013.01); *C08L 2205/025* (2013.01); *C08L 2205/03* (2013.01)

(58) Field of Classification Search
CPC .. B29C 44/02; C08G 59/245; C08G 2101/00; C08J 9/0061; C08J 9/08; C08J 9/103; C08J 9/107; C08J 2201/03; C08J 2203/02; C08J 2203/04; C08J 2323/08; C08J 2363/00; C08J 2363/02; C08J 2375/04; C08J 2423/08; C08L 23/0884; C08L 63/00; C08L 2203/14; C08L 2205/025; C08L 2205/03; B29K 2063/00
See application file for complete search history.

(56) References Cited

U.S. PATENT DOCUMENTS

| | | | | |
|---|---|---|---|---|
| 5,274,006 | A * | 12/1993 | Kagoshima ................ | C08J 9/06 521/104 |
| 7,125,461 | B2 * | 10/2006 | Czaplicki ............. | B62D 29/002 156/79 |

FOREIGN PATENT DOCUMENTS

| | | |
|---|---|---|
| CN | 1798820 A | 7/2006 |
| DE | 10 2011 080 223 A1 | 2/2013 |
| EP | 0 500 009 A1 | 8/1992 |
| EP | 1 055 699 A1 | 11/2000 |
| WO | 2004/101349 A2 | 11/2004 |
| WO | 2014/040913 A1 | 3/2014 |
| WO | 2016/097365 A1 | 6/2016 |

OTHER PUBLICATIONS

Sep. 18, 2017 International Search Report issued in International Patent Application No. PCT/EP2017/068282.
Sep. 18, 2017 Written Opinion of the International Searching Authority issued in International Patent Application No. PCT/EP2017/068282.

* cited by examiner

*Primary Examiner* — Irina S Zemel
(74) *Attorney, Agent, or Firm* — Oliff PLC

(57) ABSTRACT

A thermally expandable composition, including at least one epoxy-functional polymer, at least one thermoplastic polymer, at least one chemical blowing agent, and at least one activator, wherein the epoxy-functional polymer is present in the composition before expansion with an amount of between 30 and 75 wt.-%, based on the total composition, and the epoxy-functional polymer includes at least 300 mmol epoxy groups per kg polymer, and wherein the chemical blowing agent is able to form at least one reaction product with at least two amino groups upon thermal decomposition, and the chemical blowing agent is in the composition before expansion with an amount of between 5 and 30 wt.-%, based on the total composition.

19 Claims, No Drawings

APPROACH TO HEAT EXPANDABLE MATERIALS

TECHNICAL FIELD

The present invention relates to a thermally expandable thermoplastic composition, resulting in a stable foam material, as well as a baffle and/or reinforcement element for hollow structures comprising such a thermally expandable composition, a process for manufacturing such a baffle and/or reinforcement element, its use to seal, baffle, or reinforce a hollow structure, and a method for sealing, baffling, or reinforcing a hollow structure.

BACKGROUND OF THE INVENTION

Manufactured products often contain orifices and cavities or other hollow parts that result from the manufacturing process and/or that are designed into the product for various purposes, such as weight reduction. Automotive vehicles, for example, include several such orifices and cavities throughout the vehicle, including those in the vehicle's structural pillars and in the sheet metal of the vehicle doors. It is often desirable to seal such orifices and cavities so as to minimise noise, vibrations, fumes, dirt, water, humidity, and the like from passing from one area to another within the vehicle by means of sealing members or baffle elements built into the orifice or cavity. Likewise, such members or elements often fulfil an additional task of reinforcing the hollow structure of the manufactured product, e.g. automotive part, so much that it becomes more resistant to mechanical stress but still maintains the low weight advantage of the hollow structure.

Such elements used for sealing, baffling or reinforcing often consist of a carrier, made of plastic, metal, or another rigid material, and one or more layers of a thermoplastic material attached to it which is able to expand its volume when heat or another physical or chemical form of energy is applied, but they can also be entirely made of expandable material. Using an adequate design, it is possible to insert the baffle or reinforcement element into the hollow part of the structure during the manufacturing process but also to leave the inner walls of the structure still accessible (or the cavities passable) by e.g. a liquid. For example, during the manufacture process of a vehicle, the hollow parts of a metal frame can still be largely covered by an electro-coating ("e-coat") liquid while the baffle or reinforcement elements are already inserted, and afterwards during a heat treatment step, the expandable thermoplastic material of the baffle or reinforcement element expands to fill the cavities as intended.

The development of such baffles or reinforcement elements has led to highly advanced systems, where the expandable material is able to increase its volume by up to 1500% or more, forming a foam-like structure that fills the cavities and adhering to the walls of the structure intended to be sealed, baffled, or reinforced. Especially in automotive manufacturing, this has led to considerable weight reduction and excellent dampening of noise or vibrations in the car body.

Currently employed thermally expandable compositions often consist of polymers such as ethylene-vinyl acetate polymers that can be cross-linked via radical chemistry mechanisms by use of, e.g., peroxides as initiators. In order to obtain foams, these compositions furthermore contain blowing agents. Under activation conditions, such as elevated temperature, curing by radical chemistry of the cross-linkable network takes place, while simultaneously the blowing agent decomposes and releases gases. This leads to the above mentioned volume expansion and the formation of a stable foam which in ideal cases fills the cavity as intended and adheres to its walls. Such a system is for example disclosed in DE 10 2011 080 223 A1.

While these standard expandable compositions were optimized sufficiently into highly advanced products, they still suffer from significant drawbacks inherent to their radical chemistry curing mechanisms. The peroxide initiators are activated by elevated temperature and therefore limit the storage stability of compositions containing such compounds, as they decompose slowly over time even at ambient temperatures, a problem which becomes more severe in hot climates or under non-ideal storage conditions. Furthermore, due to their oxidizing nature, peroxides can cause oxidation side reactions in the composition itself and the surrounding substrate on which they are used, potentially leading to damages and deteriorations. Such reactions have to be inhibited or moderated by use of expensive antioxidants that cause a significant cost burden on the formulation of the expandable compositions.

It is thus desirable to obtain a thermally expandable composition that overcomes these drawbacks by using a different approach to its curing instead of radical chemistry curing mechanisms.

SUMMARY OF THE INVENTION

It is an object of the present invention to provide a thermally expandable composition that is able to expand and cure into a stable foam structure, without requiring curing agents, such as peroxides. Furthermore, the thus produced foam should be able to expand uniformly over a temperature range of between 150° C. and 220° C. and provide excellent adhesion to metallic, even oily, and other substrates commonly used in automotive manufacturing.

Surprisingly, the present invention provides a solution to that problem by providing a composition comprising an epoxy-functional polymer, optionally another, thermoplastic polymer, a selected chemical blowing agent, and optionally an activator for said chemical blowing agent.

Thus, the present invention achieves this object with the features of independent claim 1 by providing a thermally expandable composition, comprising
(a) at least one epoxy-functional polymer EP,
(b) optionally at least one thermoplastic polymer P,
(c) at least one chemical blowing agent B,
(d) optionally at least one activator A,
wherein said epoxy-functional polymer EP is present in the composition before expansion with an amount of between 30 and 75 wt.-%, based on the total composition, and said epoxy-functional polymer EP comprises at least 300 mmol epoxy groups per kg polymer EP, and wherein said chemical blowing agent B is able to form at least one reaction product with at least two amino groups upon thermal decomposition, and said chemical blowing agent B is present in the composition before expansion with an amount of between 5 and 30 wt.-%, based on the total composition.

The composition according to the present invention is particularly suitable to be used in a sealing, baffle or reinforcement element, for example in automotive applications. Further aspects of the present invention are subject of other independent claims. Preferred embodiments of the invention are subject of dependent claims.

DETAILED DESCRIPTION OF THE INVENTION

The unit term "wt.-%" means percentage by weight, based on the weight of the respective total composition, if not otherwise specified. The terms "weight" and "mass" are used interchangeably throughout this document.

Compound names beginning with "poly" designate on the one hand polymers as known to the person with skill in chemistry, and on the other hand substances, which formally contain, per molecule, two or more of the functional groups occurring in their names. The compound can be a monomeric, oligomeric or polymeric compound. For instance, a polyol is a compound having two or more hydroxy groups; a polyisocyanate is a compound having two or more isocyanate groups.

The average molecular weight is understood to mean the number average molecular weight, as determined using conventional methods, preferably by gel permeation-chromatography (GPC) using polystyrene as standard, styrene-divinylbenzene gel with porosity of 100 Angstrom, 1000 Angstrom and 10000 Angstrom as the column and tetrahydrofurane as a solvent, at 35° C.

The term "functionality" in connection with a molecule describes in this document the number of chemical functional groups per molecule. The term "polyfunctional" describes a molecule with more than 1 functional groups of a given type. For example, a polyfunctional amine with a functionality of 3 describes a molecule with 3 amino groups. The term "average functionality" is used if a mixture of molecules is present that differ slightly in individual functionality, but in average exhibit a given functionality, as it is sometimes the case with technical grade chemicals.

The term "radical" used in this document in connection with polymers cross-linkable by peroxide describes, as known to a person with ordinary skill in the art of chemistry, a chemical species with an unpaired valence electron. The cross-linking reactions involved in the curing or hardening of the polymer system of the present invention follow a radical mechanism.

Melt flow index (MFI) is determined by the ASTM D1238 standard method, using a capillary rheometer at 190° C. and a weight of 2.16 kg. MFI values describe the amount of polymer coming out of the capillary under pressure of the defined weight and at the defined temperature during a given time.

The amount (in mmol) of epoxy groups per kg polymer is determined by ASTM D1652 or DIN 16945 standard methods or is calculated from the weight percentage of epoxy group-containing monomers in the case of a copolymer.

Volume changes on the thermally expandable material are determined using the DIN EN ISO 1183 method of density measurement (Archimedes principle) in deionised water in combination with sample mass determined by a precision balance.

All industrial norms mentioned in this document are referring to the respective current versions at the time of filing.

As a first necessary component, the inventive composition comprises at least one epoxy-functional polymer EP. Suitable as polymer EP are all polymers that comprise at least 300 mmol epoxy groups per kg polymer EP, preferably at least 400 mmol epoxy groups per kg polymer EP, more preferably at least 500 mmol epoxy groups per kg polymer EP. The molar amount of epoxy groups per kg polymer EP can be calculated on the basis of epoxy-group containing monomers used for its production, for example in the case of glycidyl methacrylate copolymers, or it is accessible by analytic methods such as defined in ASTM D1652 and DIN 16945. Preferably, these polymers EP are thermoplastic polymers that are liquid at room temperature or have a melting point of less than 150° C., preferably less than 120° C., more preferably less than 110° C. These polymers must have an epoxy functionality of at least approximately 2, in other words, they are diepoxides or polyepoxides.

Preferred suitable epoxy-functional polymers EP include ethylene-acrylic ester copolymers, for example, ethylene-glycidyl methacrylate copolymers, such as Lotader® copolymers, in particular Lotader AX8900 and Lotader® AX8840 (by Arkema), and Lotryl® copolymers (by Arkema).

Furthermore suitable and preferred are ethylene glycidyl methacrylate copolymers such as Elvaloy® PTW and Elvaloy® 4170 (by DuPont).

Also suitable as epoxy-functional polymer EP are polyurethane-based polymers of the formula (I),

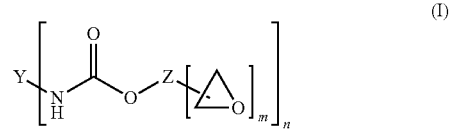

wherein Y represents a n-valent radical of a linear or branched polyurethane polymer PU terminated with isocyanate groups after the removal of the n terminal isocyanate groups, Z represents a (1+m)-valent radical of an aliphatic, cycloaliphatic, aromatic or araliphatic epoxide E containing a primary or secondary hydroxyl group after the removal of the hydroxyl group and m epoxide groups, m represents an integer with a value of 1, 2, or 3, preferably 2, and n represents an integer with a value from 2 to 4.

The linear or branched polyurethane polymer PU mentioned above has a structure according to formula (II),

wherein Y and n have the same meaning as described further above.

The polyurethane polymer PU, represented in formula (II), is obtained from at least one diisocyanate or triisocyanate and from at least one polymer having terminal hydroxyl groups, thiol groups, primary amino groups or secondary amino groups.

Suitable polyols for the production of polyurethane polymer PU include, for example, polyoxyalkylene polyols, also referred to as polyether polyols, which are the polymerization product of ethylene oxide, 1,2-propylene oxide, 1,2- or 2,3-butylene oxide, tetrahydrofuran or mixtures thereof, optionally polymerized by means of a starter molecule with two or three active H atoms such as water or compounds with two or three OH groups, for example ethylene glycol or glycerol.

Particularly preferred polyether polyols are polymerization products of ethylene oxide, 1,2-propylene oxide, 1,2- or 2,3-butylene oxide, tetrahydrofuran or mixtures thereof; particularly preferable are polypropylene oxides and polytetrahydrofurans. Such polyether polyols are commercially available. Commercially available polytetrahydrofurans are, for example, the PolyTHF® products from BASF, such as PolyTHF® 2000, PolyTHF® 2500 CO or PolyTHF® 3000 CO. Commercially available polypropylene oxides are, for example, Caradol® products from Shell, such as Carador® 2000 or Caradol® ED56, or Acclaim® products from Bayer, such as Acclaim® Polyol 2200, Acclaim® Polyol 12200 or Acclaim® Polyol 4200. Further possible polyether polyols are Voranol® 1010L, Voranol® EP1900 or Voranol® CP4755 from Dow. Especially preferred polyether polyol is polytetrahydrofuran.

The average molecular weight of the polyether polyols used can vary. The polyether polyols have, for example, a weight average molecular weight (Mw) in the range from 500 to 5000 g/mol, preferably 1000 to 3000 g/mol and particularly preferably in the range from 1500 to 2500 g/mol, in particular approximately 2000 g/mol.

The OH functionality of the polyether polyols used is preferably in the range of approximately 2, for example, in the range from 1.9 to 2.1. Optionally, a compound with an OH functionality of 3, such as, for example, trimethylolpropane, butoxylated trimethylolpropane (for example, Simulsol® TOMB), and/or pentaerythritol can be added to the polyether polyol in order to increase the OH functionality.

Furthermore suitable polyols include hydroxyl-terminated rubbers. One or more OH-terminated rubbers can be used, wherein the use of two OH-terminated rubbers, in particular two OH-terminated polybutadienes, are preferred. Here, OH-terminated rubbers are understood to refer, for example and preferably, to hydroxyl-terminated polybutadienes and to castor oil-based polyols, wherein hydroxyl-terminated polybutadienes are particularly preferable. Polyols based on castor oil include castor oil of various grades, and castor oil derivatives. Commercially available hydroxyl-terminated polybutadienes are, for example, the Poly bd® and Krasol® products from Cray Valley, such as Krasol® LBH-P 2000 or Poly bd® R45V, or Polyvest® HT from Evonik, or Hypro® 2800X95 HTB from Emerald Materials. Castor oil-based polyols are, for example, the Albodur® products from Alberdingk Boley, such as Albodur® 901, or the Polycine® products from Baker Castor Oil Company, such as Polycine®-GR80.

The OH functionality of the hydroxyl-terminated rubbers used is preferably in the range from 1.7 to 2.2 for anionically produced types or from 2.2 to 2.8 for types produced by free radical polymerization.

Also suitable as polyols are polyhydroxy-terminated acrylonitrile/butadiene copolymers, of the kind preparable, for example, from carboxyl-terminated acrylonitrile/butadiene copolymers (available commercially under the name Hypro® (formerly Hycar®) CTBN from Emerald Materials), and from epoxides or amino alcohols.

Furthermore suitable are polyester polyols prepared, for example, from dihydric to trihydric alcohols such as, for example, 1,2-ethanediol, diethylene glycol, 1,2-propanediol, dipropylene glycol, 1,4-butanediol, 1,5-pentanediol, 1,6-hexanediol, neopentylglycol, glycerol, 1,1,1-trimethylolpropane or mixtures of the aforementioned alcohols, with organic dicarboxylic acids or their anhydrides or esters, such as, for example, succinic acid, glutaric acid, adipic acid, suberic acid, sebacic acid, dodecanedicarboxylic acid, maleic acid, fumaric acid, phthalic acid, isophthalic acid, terephthalic acid, and hexahydrophthalic acid, or mixtures of the aforementioned acids, and also polyester polyols from lactones such as ε-caprolactone, for example.

Suitable as polyols are furthermore polycarbonate polyols of the kind obtainable by reacting, for example, the above-mentioned alcohols—those used to synthesize the polyester polyols—with dialkyl carbonates, diaryl carbonates or phosgene;

Also suitable are polyols of the kind obtained by reduction of dimerized fatty acids.

The polyurethane polymer PU may comprise only one type of polyol.

Preferred single polyols are polyether polyols, in particular polytetrahydrofuran. It may however be advantageous to use a mixture of different polyols for the production of polyurethane polymer PU. In a preferred embodiment, polymer PU comprises a polyether polyol, in particular polytetrahydrofuran and a polybutadiene polyol.

Apart from polyols, it is also possible to use polyamines, leading to polyurea polymers when reacted with polyisocyanates. It is however preferred to use only polyols, or a mixture of polyols and polyamines. Among the suitable polyamines are in particular amino group-terminated polyethylene ethers or polypropylene ethers, as sold, for example, under the name Jeffamine® by Huntsman; amino group-terminated polybutylene ethers, polybutadienes, butadiene/acrylonitrile copolymers, more particularly of the kind sold, for example, under the name Hypro® (formerly Hycar®) ATBN by Emerald Materials; and amino group-terminated synthetic rubbers.

Suitable polyisocyanates for the production of polyurethane PU are diisocyanates or triisocyanates. Suitable diisocyanates are aliphatic, cycloaliphatic, aromatic or araliphatic diisocyanates, in particular commercial products such as methylene diphenyl diisocyanate (MDI), hexamethylene diisocyanate (HDI), toluene diisocyanate (TDI), toluidine diisocyanate (TODI), isophorone diisocyanate (IPDI), trimethyl hexamethylene diisocyanate (TMDI), 2,5- or 2,6-bis (isocyanatomethyl)-bicyclo[2.2.1]heptane, 1,5-naphthalene diisocyanate (NDI), dicyclohexyl methyl diisocyanate ($H_{12}$MDI), p-phenylene diisocyanate (PPM), m-tetramethyl xylylene diisocyanate (TMXDI), etc., as well as their dimers. HDI, IPDI, MDI or TDI are preferable. Particularly preferable are aliphatic and in particular cycloaliphatic diisocyanates such as, for example, HDI, $H_{12}$MDI and IPDI.

Suitable triisocyanates are trimers or biurets of aliphatic, cycloaliphatic, aromatic or araliphatic diisocyanates, in particular the isocyanurates and biurets of the diisocyanates described in the preceding paragraph.

The at least one polyisocyanate is reacted with the at least one polyol to produce an isocyanate-terminated polyurethane polymer PU with standard methods well known to the person with average skill in the field of polyurethane chemistry.

The isocyanate-functional polyurethane polymer PU is then end-capped with at least one hydroxyl-functional epoxide E according to formula (III),

(III)

wherein Z and m have the same meaning as described further above.

The aliphatic, cycloaliphatic, aromatic or araliphatic epoxide E which contains a primary or secondary hydroxyl group, also referred to in this document as monohydroxyl epoxide compound contains 1, 2 or 3 epoxide groups. The hydroxyl group of this monohydroxyl epoxide compound E may be a primary or a secondary hydroxyl group.

The epoxy resin E is, in particular, a liquid epoxy resin. The epoxy resin contains or consists of hydroxyl-containing species, in particular the hydroxyl epoxy compound of formula (III). The epoxy resin or liquid epoxy resin can be a commercially available epoxy resin product.

Monohydroxyl epoxide compounds of this kind can be produced, for example, by reacting polyols with epichlorohydrin. Depending on the reaction regime, the reaction of polyfunctional alcohols with epichlorohydrin produces by-products including the corresponding monohydroxyl epoxide compounds in different concentrations. These can be isolated by routine separation operations. Generally speaking, however, it is sufficient to use the product mixture obtained in the glycidylization reaction of polyols, comprising fully reacted polyol and polyol which has reacted partially to form the glycidyl ether. Examples of hydroxyl-containing epoxides of this kind are butanediol monoglycidyl ether (contained in butanediol diglycidyl ether), hexanediol monoglycidyl ether (contained in hexanediol diglycidyl ether), cyclohexanedimethanol glycidyl ether, trimethylolpropane diglycidyl ether (contained as a mixture in trimethylolpropane triglycidyl ether), glycerol diglycidyl ether (contained as a mixture in glycerol triglycidyl ether), pentaerythritol triglycidyl ether (contained as a mixture in pentaerythritol tetraglycidyl ether). It is preferred to use trimethylolpropane diglycidyl ether, which occurs at a relatively high fraction in customarily prepared trimethylolpropane triglycidyl ether.

It is, however, also possible to use other, similar hydroxyl-containing epoxides, especially glycidol, 3-glycidyloxybenzyl alcohol or hydroxymethylcyclohexene oxide. Further preference is given to the β-hydroxy ether of the formula (IV), which is present with about 5-15 wt.-% in commercial liquid epoxy resins prepared from bisphenol A (R=CH$_3$) and epichlorohydrin, and also to the corresponding β-hydroxy ethers of the formula (IV), which are formed in the reaction of bisphenol F (R=H) or of the mixture of bisphenol A and bisphenol F with epichlorohydrin.

epoxy resins. Distillation residues of this kind have a concentration of hydroxyl-containing epoxides which is up to three times higher than that of commercial undistilled liquid epoxy resins. Example for such a resin is the product Epilox® M850 from Leuna-Harze. Moreover, it is also possible to use a wide variety of epoxides containing a β-hydroxy ether group, prepared by the reaction of (poly)epoxides with a substoichiometric amount of monofunctional nucleophiles such as carboxylic acids, phenols, thiols or secondary amines.

Most preferred as epoxy-functional polymer EP in the present inventive composition are glycidyl methacrylate copolymers (with ethylene and/or acrylic ester co-monomers), as well as epoxy-functional reaction products of bisphenol A and bisphenol F with epichlorohydrin.

The at least one epoxy-functional polymer EP is present in the composition before expansion with an amount of between 30 and 75 wt.-%, based on the total composition, in particular between 30 and 70 wt.-%, preferably between 35 and 60 wt.-%, more preferably between 40 and 55 wt.-%, based on the total weight of the composition before expansion.

Preferred for the present invention is one or more polymer EP that is either liquid at room temperature, or in case it's a solid thermoplastic material, exhibits an average melt flow index (MFI) of between 0.5 and 25 g/10 min, preferably between 1 and 20 g/10 min, more preferably between 2.5 and 15 g/10 min.

The present invention furthermore optionally but preferably comprises at least one thermoplastic polymer P. Principally all thermoplastic polymers or thermoplastic elastomers are suitable as polymer P.

Suitable polymers P include, for example, styrene-butadiene copolymers, styrene-isoprene copolymers, ethylene-vinyl acetate copolymers (EVA), ethylene-methacrylate copolymers, ethylene-ethyl acrylate copolymers, ethylene-butyl acrylate copolymers (EBA), ethylene-(meth)acrylic acid copolymers, ethylene-2-ethylhexyl acrylate copolymers, ethylene-acrylic ester copolymers, polyolefinc block

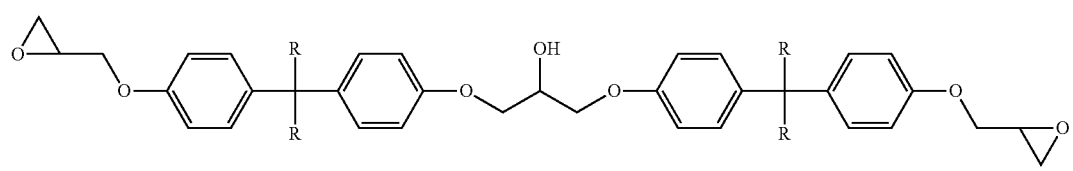

(IV)

Such liquid epoxy resins of formula (IV) are commercial products, for example, Araldite® GY 250, Araldite® PY 304, Araldite® GY 282 (Huntsman and Hexion) or D.E.R.® 331, D.E.R.® 330 or D.E.R.® 332 (Dow) or Epikote® 828 (Hexion).

Those reaction products represented in formula (V), and in particular reaction products of bisphenol A and F with epoichlorohydrin with higher molecular weight are also directly, and without reaction with a polyurethane polymer PU, suitable as epoxy-functional polymer EP, if they fulfill the requirements for epoxy-functional polymer EP defined above. Preferred such epoxy-functional polymers include for example the D.E.R.® product range by Dow.

Preference for endcapping the polyurethane polymer PU mentioned above extends to distillation residues which are obtained in the preparation of high-purity, distilled liquid copolymers, and polyolefins such as polyethylene or polypropylene, and halogenated polyolefins, such as polyvinyl chloride (PVC).

Among those, the copolymers, meaning polymers made from more than one type of monomer, can be block type copolymers or random copolymers.

Polymers P may contain unsaturated olefinic bonds and they can also be functionalised, meaning they can contain functional groups such as halogen, nitrile, thiol, hydroxyl, carboxyl, anhydride, acrylate, and/or glycidylmethacrylate groups. It is however preferred to use polymers P without such further functionalization, if they may interfere with the curing mechanism of the composition. This approach offers a better controllability of the curing mechanism and secondary properties such as the adhesion properties.

Preferred for the present invention is one or more polymer P with an average melt flow index (MFI) of between 1 and 200 g/10 min, preferably between 10 and 100 g/10 min, more preferably between 25 and 75 g/10 min, most preferably between 35 and 55 g/10 min.

Polymer P preferably comprises or essentially consists of ethylene-vinyl acetate (EVA). In this case, the content of vinyl acetate monomers in EVA should be between 8 and 45 wt.-%, preferably between 15 and 30 wt.-%, based on the total weight of the EVA polymer.

In a preferred embodiment, polymer P comprises EVA with 32 wt.-% vinyl acetate monomer and a MFI of 43 g/10 min.

In another preferred embodiment, polymer P comprises ethylene-butyl acrylate (EBA) copolymer with 35 wt.-% butyl acrylate monomer and a MFI of 40 g/10 min.

In cases where more than one type of polymer P is used, the individual MFI combine to an average MFI of the used polymer mixture, which has to be determined according to ASTM D1238.

The thermally expandable composition according to the present invention preferably contains said at least one polymer P with an amount of between 0 and 40 wt.-%, in particular between 5 and 40 wt.-%, preferably between 10 and 40 wt.-%, more preferably between 15 and 40 wt.-%, based on the weight of the total composition before expansion.

In a preferred embodiment, more than one type of polymer is used as polymer P. It was found to be beneficial for the properties of the inventive composition to use at least two types of polymer (herein named P1 and P2) with different melt flow index (MFI), one much higher than the other. For example, an especially preferred embodiment uses a first polymer P1 with an MFI of between 100 and 200 g/10 min and a second polymer P2 with an MFI of between 0.1 and 60 g/10 min, preferably between 0.1 and 10 g/10 min, preferably with a weight ratio of the two polymers P1:P2 in the composition of 0.7 to 2.0, preferably 1 to 1.7.

A preferred embodiment using two EVA copolymers comprises as polymer P1 an EVA with 18 wt.-% vinyl acetate monomer and a melt flow index (MFI) of 150 g/10 min and as polymer P2 an EVA with 28 wt.-% vinyl acetate monomer and a MFI of 6 g/10 min. Most preferred weight ratio of the two polymers P1:P2 is between 1.3 and 1.7.

When using two polymers, comprising P1 with an MFI of between 100 and 200 g/10 min and a second polymer P2 with an MFI of between 0.1 and 60 g/10 min, a preferred amount for P1 is between 1 and 35 wt.-%, preferably between 10 and 35 wt.-% and for P2 between 10 and 50 wt.-%, preferably between 15 and 30 wt.-%.

Another preferred embodiment uses two ethylene-butyl acrylate (EBA) copolymers, comprising as P1 an EBA with 34 wt.-% butyl acrylate monomer and a MFI of 40 g/10 min and as P2 an EBA with 30 wt.-% butyl acrylate monomer and a MFI of 2 g/10 min.

The next essential component of the present inventive composition is at least one chemical blowing agent B. Said chemical blowing agent B is able to form at least one reaction product with at least two amino groups upon thermal decomposition, and said chemical blowing agent B is present in the composition before expansion with an amount of between 5 and 30 wt.-%, preferably between 7 and 25 wt.-%, more preferably between 9 and 15 wt.-%, based on the total composition.

Chemical blowing agents are organic or inorganic compounds that decompose under influence of, e.g., temperature or humidity, while at least one of the formed decomposition products is a gas.

Preferred chemical blowing agents for the present inventive composition include azo compounds, nitroso compounds, and carbamates.

Suitable preferred chemical blowing agents B include, e.g., azodicarbonamide, azocyclohexyl nitrile, dinitrosopentamethylene tetramine, azodiamino benzene, and combinations thereof and the like.

In especially preferred embodiments, the blowing agent B comprises or essentially consists of azodicarbonamide.

In another preferred embodiment, the blowing agent B comprises or essentially consists of a carbamate. Particularly preferred are carbamates according to formula (V),

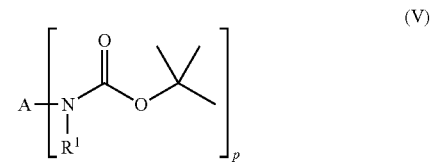

wherein
$R^1$ represents a hydrogen radical or a linear or branched monovalent hydrocarbon radical having 1 to 10 carbon atoms, preferably 1 to 5 carbon atoms, which optionally contain one or more heteroatoms, and/or C—C multiple bonds, and/or cycloaliphatic, and/or aromatic moieties, or together with A represents an (n+1)-valent hydrocarbon radical having 4 to 40 carbon atoms, preferably 4 to 20 carbon atoms, which optionally contains one or more heteroatoms, and/or cycloaliphatic moieties;
A represents a linear or branched n-valent hydrocarbon radical having 1 to 20 carbon atoms, which optionally contains one or more heteroatoms, in particular in the form of ether oxygen or amine nitrogen, and optionally one or more C—C multiple bonds, and/or cycloaliphatic, and/or aromatic moieties, or together with $R^1$ represents an (n+1)-valent hydrocarbon radical having 4 to 40 carbon atoms, preferably 4 to 20 carbon atoms, which optionally contains one or more heteroatoms, and/or cycloaliphatic moieties;
index p stands for a value of 2 or 3 or 4, preferably 2 or 3, most preferably 2. Most preferred for $R^1$ is a hydrogen radical.

The carbamates according to formula (V) have the advantage that they produce an especially high amount of gas when decomposing, since per carbamate group according to (V), 1 molecule of $CO_2$ and 1 molecule of isobutylene are released. This leads to a higher gas volume and better foam structure.

This method of manufacturing carbamates according to formula (V) uses the reaction of amines with equimolar amounts of di-tert-butyl dicarbonate to form the corresponding tert-butyl carbamate (V). This reaction is known to introduce tert-butyloxycarbonyl (BOC) groups, normally in the function as a protecting group, to amines. This is performed with well-known synthetic procedures, for example in tetrahydrofuran (THF) with triethylamine base at 25° C.

Suitable amines for this reaction include linear or branched di- or polyamines having 1 to 20 carbon atoms which optionally contain one or more heteroatoms, in particular in the form of ether oxygen or amine nitrogen, and optionally one or more C—C multiple bonds, and/or cycloaliphatic, and/or aromatic moieties. Such amines can have 1 to 4 primary and/or secondary amino groups, while polyamines with 2 or 3 primary and/or secondary amino groups are preferred.

Most preferred are di- and triamines, especially diamines including ethane-1,2-diamine, propane-1,2-diamine, propane-1,3-diamine, butane-1,3-diamine, butane-1,4-diamine, pentane-1,5-diamine, 2-methyl-1,5-pentanediamine (MPMD), octane-1,8-diamine, decane-1,8-diamine, dodecane-1,12-diamine, 2,2-dimethylpropane-1,3-diamine, 4-(aminomethyl)octane-1,8-diamine, piperazine, 3-oxapentane-1,5-diamine (available under the trade name Jeffamine® EDR-104, by Huntsman), 3,6-dioxaoctane-1,8-diamine (available under the trade name Jeffamine® EDR-148, by Huntsman), and 4,7-dioxadecane-1,10-diamine (available under the trade name Jeffamine® EDR-176, by Huntsman). Most preferred chemical blowing agent B of formula (V) is di-tert-butyl hexane-1,6-diyldicarbamate.

The chemical blowing agent B according to formula (V) preferably comprises a carbamate with low molecular weight and/or high carbamate functionality. This ensures a high gas volume per mass unit of chemical blowing agent employed in any process. Thus, those embodiments are preferred wherein said carbamate has a molecular weight of between 131 g/mol and 750 g/mol, preferably between 131 g/mol and 500 g/mol, more preferably between 131 g/mol and 450 g/mol.

The heat required for the decomposition reaction that causes the foaming (expansion) can be applied externally or internally, the latter e.g. from an exothermic reaction. Preferably, the blowing agent is activated (i.e. starts to decompose under gas release) at a temperature of less than 160° C.

If the present inventive thermally expandable composition finds a use in a baffle and/or reinforcement element, e.g. in automotive manufacturing, it is preferable that the activation temperature of the blowing agent is adjusted to the manufacturing conditions of the automotive part to be baffled or reinforced. As an example, the baffle and/or reinforcement element can be inserted into a cavity of a structure that needs to be treated by an electrocoating liquid, in its unexpanded state still leaving the surface of the structure accessible, and subsequently, during the heat treatment of the automotive part (i.e. the curing procedure for the electrocoating liquid), the baffle and/or reinforcement element simultaneously (or shortly thereafter) expands to its intended final shape and at least partially closes or fills the cavity. In such a case, the expansion temperature should correspond to the temperature conditions of said heat treatment, e.g. to between 140° C. and 220° C.

In preferred embodiments, compositions according to the present invention furthermore comprise at least one activator A for decomposing the at least one blowing agent B.

Although it is possible that any embodiment of the present invention may expand by decomposition of the chemical blowing agent B in a suitable fashion at a suitable temperature for a certain application without the use of an activator A, it is generally preferred to use an activator A. Such an activator catalyzes or facilitates the decomposition of the chemical blowing agent B in a way that lower decomposition temperatures and/or a faster decomposition can be achieved, which may be beneficial for the expansion process.

Suitable activators A are all compounds which catalyze or activate the decomposition of the chemical blowing agent B. Depending on the respective structure and chemical basis of the blowing agent B, such compounds may include organic or inorganic acids, bases, or metal complexes.

Examples of compounds suitable for this purpose include zinc compounds, such as zinc oxide, zinc acetate, zinc stearate, zinc bis(p-toluenesulphinate), or zinc bis(benzenesulphinate), titanium oxide, magnesium oxide, or urea derivates, in particular urea, N-methyl urea, N,N-dimethyl urea, N,N'-dimethyl urea, N,N,N'-trimethyl urea, N,N,N',N'-tetramethyl urea, and derivates of those where some or all methyl groups are ethyl groups instead. Most preferred are zinc compounds, especially zinc oxide, and mixtures of zinc compounds, especially mixtures of zinc oxide and zinc acetate, and mixtures of zinc compounds and carboxylic acids, in particular zinc oxide and stearic acid. Especially preferred are furthermore mixtures of zinc oxide and carboxylic acids, especially stearic acid, and urea compounds, in particular N,N-dimethyl urea.

It is strongly advised to optimize the amount of activator A relative to the amount of blowing agent B. For the present invention, it is preferred to use an amount of activator A of between 10 and 80 wt.-%, preferably between 12 and 60 wt.-%, more preferably between 15 and 50 wt.-%, most preferably between 20 and 35 wt.-%, based on the weight of blowing agent B comprised in the composition.

In preferred embodiments of the present invention, especially when using azodicarbonamide as chemical blowing agent B, the activator A comprises a zinc compound, especially zinc oxide, and mixtures of zinc compounds, especially mixtures of zinc oxide and zinc acetate.

In other preferred embodiments, in particular when using a carbamate as chemical blowing agent B, activator A comprises at least one acid, preferably a carboxylic acid. Suitable acids include in particular carboxylic acids which are solid at room temperature (23° C.). Both monoacids and polyacids are suitable. In an especially preferred embodiment, in particular when using a carbamate as chemical blowing agent B, activator A comprises at least one carboxylic acid with a pKa value of between 2.5 and 5. It is possible to use stronger carboxylic acids, such as trifluoroacetic acid, which are even more efficient in decomposing carbamates. However, it is preferred to use weaker carboxylic acids with pKa values of between 2.5 and 5 in order to maintain a useful stability of the chemical blowing agent B, in particular when using a carbamate.

Preferred activators A include carboxylic acids, in particular those which are solid at room temperature (23° C.) and/or exhibit a pKa value of between 2.5 and 5. Examples of such preferred activators AC include monocarboxylic acids such as C10 to C20 fatty acids, in particular stearic acid, aromatic carboxylic acids such as benzoic acid or salicylic acid, or polycarboxylic acids such as adipic acid, fumaric acid, or citric acid. Most preferred are stearic acid, salicylic acid, and citric acid.

In preferred embodiments where at least one carbamate is used as chemical blowing agent B and at least one carboxylic acid is used as activator A, the chemical blowing agent B exhibits a molar ratio of carbamate functions of said carbamate to carboxylic acid functions of said activator A of approximately 1.1.

The thermally expandable composition according to the present invention may preferably comprise at least one stabilizer S.

Said stabilizer S stabilizes the foam created by the gas of decomposing blowing agent B in the inventive composition.

Foam stabilization is usually achieved either by means of foam stabilizers and/or by fast crosslinking of the thermoplastic melt. Foam stabilizers help maintaining the stability of the gas bubbles of the foam, which protects the foam from collapsing until the thermoplastic material is cured or solidified enough to maintain the cellular structure.

Suitable foam stabilizers S include for example low molecular weight, amphiphilic molecules, such as polyether-modified polysiloxanes (e.g. Tegostab® products by Evonik, or Silbyk® 9000, Silbyk® 9020, and Silbyk® 9230 by Altana Group) or monoglycerides (e.g. glycerol monostearate such as Dimodan HP®, by Danisco). Furthermore suitable is sodium sec-alkanesulfonate as sold under the trade name Armostat® 3002 by AkzoNobel. Other suitable foam stabilizers S include siloxane-glycol random copolymers, or long chain branched polymers as for example described in WO 2014/040913 A1, the disclosure of which is hereby incorporated by reference. Also suitable stabilizers S are thixotropic agents such as calcium carbonate as e.g. sold under the trade name Omyacarb® 5-GU or fumed silica, such as Aerosil® R972 by Evonik or HDK® H18 by Wacker.

In a preferred embodiment of the thermally expandable composition according to the present invention, said stabilizer S is contained in an amount of between 0.1 wt.-% and 3% wt.-%, preferably between 0.2 wt.-% and 2 wt.-%, more preferably between 0.25 wt.-% and 1 wt.-%, based on the total weight of the thermally expandable composition.

The inventive composition furthermore preferably comprises at least one antioxidant. Antioxidants are commonly used in polymer-based compositions and known to the person skilled in the art of polymer-based composition formulation. For the present invention, their use offers the advantage of a more controlled foaming process including uniform expansion of the composition and crosslinking of epoxy-functional polymer EP over a wide temperature range.

Examples of suitable antioxidants include sterically hindered aromatic amines and/or sterically hindered phenols, such as bis(3,3-bis(4'-hydroxy-3-t-butylphenyl)butanoic acid) glycol ester or tetrakis (methylene(3,5-di-t-butyl-4-hydroxy-hydrocinnamate)) methane. Most preferred antioxidant is tetrakis (methylene(3,5-di-t-butyl-4-hydroxy-hydrocinnamate)) methane. Also preferred is Tetrakis(2,4-di-Cert-butylphenyl)-4,4-biphenyldiphosphonite.

Antioxidants are preferably included with an amount of between 0.05 and 1.5 wt.-%, preferably between 0.075 and 1 wt.-%, more preferably between 0.1 and 0.5 wt.-%, based on the total weight of the composition.

It may be advantageous to use a synergist together with the antioxidant. Synergists improve the performance of the antioxidant, especially at high temperatures, and may lead to an even better expansion of the inventive composition. Examples of suitable synergists include sterically hindered thioethers, such as didodecyl 3,3'-thiodipropionate, distearyl 3,3'-thiodipropionate and/or zinc-2-mercaptotoluimidazole. Most preferred is didodecyl 3,3'-thiodipropionate.

In a preferred embodiment, the antioxidant is used with an amount of between 0.05 and 1.5 wt.-%, preferably between 0.075 and 1 wt.-%, more preferably between 0.1 and 0.5 wt.-%, based on the total weight of the composition, together with a synergist with an amount of between 0.05 and 1.5 wt.-%, preferably between 0.075 and 1 wt.-%, more preferably between 0.1 and 0.5 wt.-%, based on the total weight of the composition.

The thermally expandable composition according to the present invention is preferably essentially free of sulphur or peroxide crosslinkers known to the person skilled in the art of radical chemistry and/or vulcanization. This means, that the amount of such substances which are able to cross-link polymers having unsaturated C—C bonds is preferably below 0.2 w.-%, more preferably below 0.1 wt.-%, more preferably below 0.05 wt.-%, based on the total composition before expansion. In particular, it is preferred that the inventive compositions are free or essentially free of peroxides.

Similarly, it is preferred that the inventive composition prior to expansion is free or essentially free of polymers or other compounds having several maleic anhydride functional groups or primary amino groups, in particular primary amino groups. These functional groups are able to react with epoxy groups in a manner that may cause preliminary unwanted reactions during compounding or storage and therefore would lead to decreased storage stability. This means, that the amount of polymers or other compounds which have several anhydride or primary amino groups is preferably below 0.5 w.-%, more preferably below 0.25 wt.-%, more preferably below 0.1 wt.-%, based on the total composition before expansion. However, it may be advantageous to include small amounts, i.e. below 0.5 wt.-%, of such polymers to the inventive composition, as this leads to improved sag resistance of the resulting composition.

In preferred embodiments, the inventive composition is essentially free of anhydride, sulphur, or peroxide crosslinkers. The term "crosslinker" means substances which have more than one of these functional groups and/or which are able to form a cross-linked network with the polymers comprised in the inventive composition.

Apart from the essential and optional ingredients listed above, the present inventive thermally expandable composition may contain other components commonly used in such compositions and known to the ordinarily skilled artisan in the field. These include, for example, fillers, colorants, tackifiers, dispersion aids or homogenizers, adhesion promoters, stabilizers, and the like.

Suitable as fillers are, e.g., ground or precipitated calcium carbonate, calcium-magnesium carbonate, talcum, gypsum, graphite, barite, silica, silicates, mica, wollastonite, carbon black, or the mixtures thereof, or the like.

Fillers are, if at all, preferably incorporated in the inventive compositions with an amount of between 1 and 15 wt.-%, based on the total weight of the composition.

Colorants or dyes, such as pigments, e.g. on the basis of carbon black, may be included in the present inventive compositions. Their amount is preferably between 0 and 1 wt.-%, based on the total weight of the composition.

Processing agents as well as tackifiers may be beneficial for the present inventive composition in order to facilitate a homogeneously mixed composition. Preferably used such compounds include hydrocarbon resins, for example Novares® TL 90 available from Rutgers, Germany, Wingtack® resins (by Cray Valley), Escorez® tackifying resins (e.g., Escorez® 1304, by ExxonMobil), and Piccotac® hydrocarbon resins (e.g., Piccotac® 1100 or Piccotac® 1100E, by Eastman) or polyolefin waxes. Such compounds are preferably included in the inventive compositions with an amount of between 2 and 15 wt.-%, preferably between 4 and 10 wt.-%, more preferably between 5 and 8 wt.-%, based on the total weight of the composition.

In an especially preferred embodiment, the thermally expandable composition according to the present invention comprises said epoxy-functional polymer EP with an amount of between 30 and 55 wt.-%, based on the total composition before expansion, and said at least one thermoplastic polymer P with an amount of between 15 and 40 wt.-%, based on the total composition before expansion, and said chemical blowing agent B with an amount of between 9 and 15 wt.-%, based on the total composition before expansion, and said activator A with an amount of between 2.5 and 10 wt.-%, based on the total composition before expansion, and optionally comprises one or more additives selected from the group of tackifiers, processing agents, stabilizers, antioxidants, synergists, and fillers, wherein all individual amounts are adjusted such that the total weight percentage equals 100 wt.-%.

The compositions according to the present inventions can be manufactured by mixing the components in any suitable mixing apparatus, e.g. in a dispersion mixer, planetary mixer, double screw mixer, continuous mixer, extruder, or dual screw extruder.

It may be advantageous to heat the components before or during mixing, either by applying external heat sources or by friction generated by the mixing process itself, in order to facilitate processing of the components into a homogeneous mixture by decreasing viscosities and/or melting of individual components. However, care has to be taken, e.g. by temperature monitoring and use of cooling devices where appropriate, not to exceed the activation temperatures of the blowing agent. The final composition is preferably essentially solid at room temperature (23° C.), meaning that it does not visibly deform at this temperature just by means of gravity during at least 24 h.

After mixing, the resulting composition may be shaped into its desired form by, e.g., extruding, blow-moulding, pelleting, injection moulding, compression moulding, punching or stamping or any other suitable process.

The thermally expandable compositions may be produced in a substantially one-step process, involving the addition of all components in a series and/or simultaneously. However, it may also be advantageous to formulate the composition as a two-part system, or even multipart system, and mix these parts into the final composition at a later stage. Such an approach may, for example, increase shelf life of the composition in places with demanding conditions (such as extraordinarily high temperatures), optimise storage room demand and transport weight, and allow for tailor-made, modular compositions regarding different applications.

The expansion of the thermally expandable composition according to the present invention is triggered by heat. This means the chemical blowing agent is activated by a thermal process that exceeds its activation temperature and exhibits a duration long enough for the decomposition of the blowing agent (including gas formation) to proceed until the expandable material has expanded and cured into its intended final (sufficiently expanded and stable) state. The optimal temperature and duration (dwell time) depends on the blowing agent used in the inventive composition. The decomposition temperature of each suitable blowing agent is commonly provided by the manufacturers of such components and/or is known to the ordinarily skilled artisan. Commonly, such activation temperatures are in the range of 140° C. to 250° C., preferably 150° C. to 220° C., and require a dwell time of between 5 and 90 min, preferably between 10 and 60 min.

Another aspect of the present invention is the use of such thermally expandable compositions for the manufacturing of baffle and/or reinforcement elements. Such elements are used to seal, baffle, and/or reinforce hollow structures, e.g. a cavity in a hollow structural part of an automobile. Hollow parts in cars may include body components (e.g., panels), frame components (e.g., hydroformed tubes), pillar structures (e.g., A, B, C, or D-pillars), bumpers, roofs, or the like.

With regard to activation of the thermally expandable composition according to the present invention when used in automotive manufacturing, it is advantageous to couple the thermal activation of the composition with another process step involving heat treatment. An example for such a process step is electrocoating (cathodic dip painting/coating) of the chassis or car body.

In one preferred embodiment, such a baffle and/or reinforcement element for hollow structures consists essentially of a thermally expandable composition. In this case, it is advantageous to design the shape of the element in a way that it can be easily fitted into and attached to the walls of the hollow structure to be baffled and/or reinforced. Manufacturing is in this case preferably done by injection moulding, punching or stamping, or extrusion through a shape template.

In another preferred embodiment, such a baffle and/or reinforcement element for hollow structures comprises, apart from the thermally expandable composition, a carrier element on which the inventive thermally expandable composition is deposited or attached. Such a design may be more cost-efficient and it may facilitate fixation of the baffle and/or reinforcement element on the walls of the structure to be baffled and/or reinforced, e.g. by incorporation of pins, bolts, or hooks on the carrier element. Furthermore, with a suitable design of the carrier element, the mechanical performance and stability of the baffle and/or reinforcement element according to the present invention can be increased.

Said carrier element may consist of any material that can be processed into a shape useable for an embodiment of the present invention. Preferred materials are polymeric materials, such as a plastic, elastomers, thermoplastics, thermosettable polymers, a blend or other combination thereof, or the like. Preferred thermoplastic materials include, without limitation, polymers such as polyurethanes, polyamides, polyesters, polyolefins, polysulfones, poly(ethylene terephthalates), polyvinylchlorides, chlorinated polyolefins, or the like. Especially preferred are high-temperature stable polymers such as poly(phenyl ethers), polysulfones, polyethersulfones, polyamides, preferably polyamide 6, polyamide 6,6, polyamide 11, polyamide 12, or a mixture thereof. Other suitable materials include metals, especially aluminium or steel, or naturally grown, organic materials, such as wood or other (pressed) fibrous materials. Also glassy or ceramic materials can be used. It is possible to use any combination of such materials. It is also contemplated that such materials can be filled (e.g. with fibres, minerals, clays, silicates, carbonates, combinations thereof or the like) or foamed.

The carrier element can further exhibit any shape or geometry. It can also consist of several, not directly connected parts. For example, it can be massive, hollow, or foamed, or it can exhibit a grid-like structure. The surface of the carrier element can typically be smooth, rough, or structured, according to the intended use of the baffle and/or reinforcement element.

The manufacturing process of a baffle and/or reinforcement element in accordance with the present invention depends largely on the material of the carrier element. If the material of the carrier element can be (injection-) moulded or extruded, the whole baffle and/or reinforcement element can be produced in a two-step injection-moulding process or a co-extrusion process of the carrier element and the thermally expandable composition. If using a two-step injection moulding process, in a first step, material for the carrier element is injected into the mould. After solidification, the cavity of the injection moulding tool is enlarged or adjusted, or the injection-moulded piece is transferred into another tool and the second component, in this case the material for the thermally expandable composition, is injected.

If the carrier element is not shaped by injection-moulding or extrusion, e.g., because it consist of a metal or alloy, it may be first manufactured by a suitable process and then introduced into the injection-moulding tool, and the thermally expandable composition may be injection-moulded into the tool where the carrier element was placed. Another possibility is to extrude the thermally expandable composition onto the pre-fabricated carrier element. Of course there is also the possibility of manufacturing the carrier element and the expandable composition element individually by a suitable process, and then attaching the expandable composition element to the carrier element by any suitable means, such as chemically or physically, e.g. by gluing or the like, or mechanically, e.g. by bolting, screwing, or the like.

Another aspect of the present invention is the use of the baffle and/or reinforcement element as described above to seal, baffle, or reinforce a cavity or hollow structure of a land-, water-, or air-vehicle, preferably an automotive vehicle, and/or a cavity of a building such that the transmission of noise, vibrations, humidity, and/or heat is reduced, and/or the object surrounding said cavity is mechanically strengthened.

A further aspect of the present invention is a method for sealing, baffling and/or reinforcing a cavity or hollow structure, characterised in that an element comprising a thermally expandable composition according as described above is introduced into said cavity or hollow structure and subsequently thermally expanded such that said cavity or hollow structure is at least partially filled by the expanded composition. Preferred temperature for the thermal expansion process is between 150° C. and 220° C. Preferred baking time for the compositions is between 5 min and 30 min.

The invention is further explained in the following experimental part which, however, shall not be construed as limiting the scope of the invention.

EXAMPLES

1. Formulation of Example Compositions
1.1. Compositions

TABLE 1

Qualitative assessment of thermal expansion and curing of inventive (C-1 to C-4) and non-inventive (R-1) formulations.

| Ingredient (wt.-%) | C-1 | C-2 | R-1 | C-3 | C-4 |
|---|---|---|---|---|---|
| Epoxy-functional polymer EP1 | 68 | 68 | 68 | 73 | 73 |
| Chemical blowing agent B1 | 25 | 25 | — | — | — |
| Chemical blowing agent B2 | — | — | — | 18 | — |
| Chemical blowing agent B3 | — | — | — | — | 18 |
| Activator A1 | 7 | — | 7 | — | 9 |
| Activator A2 | — | — | — | 9 | — |
| Filler | — | — | 25 | — | — |
| TOTAL | 100 | 100 | 100 | 100 | 100 |
| Thermal expansion (qualitative assessment) | | | | | |
| 30 min at 170° C. | Excellent curing and expansion | Partial curing, low expansion | No curing, no expansion | Good curing and expansion | Good curing and expansion |
| 30 min at 205° C. | Excellent curing and expansion | Good curing, moderate expansion | No curing, no expansion | Good curing and expansion | Good curing and expansion |

TABLE 2

Detailed inventive compositions C-5 to C-6 in wt.-% of ingredients based on the total weight of the compositions before expansion, as well as the volumetric expansion data of the respective compositions.

| Ingredient (wt.-%) | C-5 | C-6 |
|---|---|---|
| Epoxy-functional polymer EP2 | 51 | — |
| Epoxy-functional polymer EP3 | — | 53 |
| Polymer P1 | 17.1 | 25 |
| Processing agent | 11 | — |
| Tackifier | — | 3 |
| Chemical blowing agent B1 | 12.3 | 11.3 |
| Activator A1 | 6.6 | 5 |
| Activator A3 | 1 | 1 |
| Antioxidant | 0.6 | 0.6 |
| Synergist | 0.4 | 0.4 |
| TOTAL | 100 | 100 |
| Thermal expansion (%) | | |
| 20 min at 160° C. | 2013 | 555 |
| 20 min at 180° C. | 2435 | 521 |
| 25 min at 200° C. | 2252 | n/m |
| Thermal expansion (%) after thermal ageing (7 days at 70° C.) | | |
| 20 min at 160° C. | 2123 | n/m |
| 20 min at 180° C. | 2580 | n/m |
| 25 min at 200° C. | 2423 | n/m |

"n/m" means "not measured".

Eleven example inventive compositions (C-1 to C-11) and one non-inventive reference composition (R-1) were prepared according to the procedure shown below. The exact individual compositions in wt.-%, based on the total weight of the individual respective composition before expansion, are listed in Tables 1 to 3.

TABLE 3

Detailed inventive compositions C-7 to C-11 in wt.-% of ingredients based on the total weight of the compositions before expansion, as well as the volumetric expansion data of the respective compositions.

| Ingredient (wt.-%) | C-7 | C-8 | C-9 | C-10 | C-11 |
|---|---|---|---|---|---|
| Epoxy-functional polymer EP2 | 44.5 | 35 | 52 | — | 46 |
| Epoxy-functional polymer EP4 | — | — | — | 48.4 | — |
| Polymer P1 | 15.6 | 19 | 15.6 | 25 | 21 |
| Polymer P2 | 7.8 | 19 | — | — | 10 |
| Processing agent | 11 | 10 | 11 | 5 | 3 |
| Tackifier | — | — | — | — | 4 |
| Chemical blowing agent B1 | 12.2 | 11 | 12.2 | 12.9 | 9 |
| Activator A1 | 6.7 | 4 | 6.7 | 6.3 | 5.5 |
| Activator A3 | 1 | 1 | 1 | 1 | 0.9 |
| Activator A4 | 0.2 | 0.2 | — | — | — |

TABLE 3-continued

Detailed inventive compositions C-7 to C-11 in wt.-% of ingredients based on the total weight of the compositions before expansion, as well as the volumetric expansion data of the respective compositions.

| Ingredient (wt.-%) | C-7 | C-8 | C-9 | C-10 | C-11 |
|---|---|---|---|---|---|
| Antioxidant | 0.4 | 0.4 | 0.4 | 0.4 | 0.6 |
| Synergist | 0.3 | 0.3 | 0.3 | 0.3 | 0.4 |
| TOTAL | 100 | 100 | 100 | 100 | 100 |
| Thermal expansion (%) | | | | | |
| 20 min at 160° C. | 2156 | 1944 | 2280 | 2153 | 1622 |
| 20 min at 180° C. | 2411 | 2143 | 2500 | 2591 | 2031 |
| 25 min at 200° C. | 2002 | 1611 | 2060 | 1539 | 1876 |

Table 1, showing model formulations only comprising the most essential components, clearly demonstrate that only inventive compositions lead to expansions and curing of the composition under elevated temperature conditions. Lack of a suitable blowing agent (R-1) leads to a composition unable to form an expanded and cured foam.

Details on the ingredients used in the inventive example compositions C-1 to C-11 and non-inventive reference composition R-1 described herein are listed in Table 4.

TABLE 4

Details on the ingredients used in the inventive and non-inventive example compositions C-1 to C-11 and R-1.

| Ingredient | Description |
|---|---|
| Polymer P1 | Ethylene-vinyl acetate (EVA) with 18 wt.-% vinyl acetate monomer and a melt flow index (MFI) of 150 g/10 min (ATSM D1238) |
| Polymer P2 | EVA with 28 wt.-% vinyl acetate monomer and MFI of 6 g/10 min (ATSM D1238) |
| Epoxy-functional polymer EP1 | Epoxy-functional liquid reaction product of epichlorohydrin with bisphenol A with epoxy group content of 5200-5500 mmol/kg (ASTM D1652) |
| Epoxy-functional polymer EP2 | Ethylene-glycidyl methacrylate copolymer (8 wt.-% glycidyl methacrylate; 563 mmol epoxy groups per kg polymer) with MFI of 6 g/10 min (ASTM D1238) |
| Epoxy-functional polymer EP3 | Ethylene-glycidyl methacrylate copolymer (5.25 wt.-% glycidyl methacrylate; 369 mmol epoxy groups per kg polymer) with MFI of 12 g/10 min (ASTM D1238) |
| Epoxy-functional polymer EP4 | Ethylene-glycidyl methacrylate copolymer (9 wt.-% glycidyl methacrylate; 633 mmol epoxy groups per kg polymer) with MFI of 8 g/10 min (ASTM D1238) |
| Antioxidant | tetrakis(methylene(3,5-di-tert.-butyl-4-hydroxy-hydrocinnamate))methane |
| Synergist | Didodecyl 3,3'-thiodipropionate |
| Chemical blowing agent B1 | Azodicarbonamide |
| Chemical blowing agent B2 | Di-tert-butyl hexane-1,6-diyldicarbamate |
| Chemical blowing agent B3 | N,N'-Dinitrosopentamethylene tetramine |
| Activator A1 | Zinc oxide |
| Activator A2 | Citric acid |
| Activator A3 | Stearic acid |
| Activator A4 | N,N-Dimethyl urea |
| Processing agent | Polyethylene wax (melting point 118° C. (ASTM D3954)) |
| Adhesion promoter | Ethylene-glycidyl methacrylate copolymer (8 wt.-% glycidyl methacrylate) with MFI of 5 g/10 min (ASTM D1238) |
| Tackifier | Hydrocarbon resin (aromatically modified C5 hydrocarbon resin) |
| Filler | Ground marble (95 wt.-% calcium carbonate) |

1.2. Mixing and Moulding Procedure

All inventive and non-inventive example compositions in this document were produced on standard production equipment suitable to compound thermoplastics with temperature control, i.e. twin screw extruder, Buss kneader or Banbury mixer. Polymers were mixed until homogeneous, then the system was cooled below activation of heat reactive raw materials. Heat reactive raw materials were then mixed into the system until homogeneous. Material was subsequently shape formed while hot into sample shapes that were used for expansion testing procedures.

2. Expansion Testing of Example Compositions

Expansion and expansion stability was tested in all samples by heat treatment (baking) of the individual samples at various temperatures during 20 min in an oven. The heating ramp from room temperature (23° C.) to the respective baking temperature was always 20 min. The temperatures and magnitude of expansion (in % based on the original volume prior to expansion) at the corresponding baking temperatures are shown in Tables 1 to 3.

Expansions were quantified for each sample by measuring the density before and after expansion. The densities were determined according to DIN EN ISO 1183 using the water immersion method (Archimedes principle) in deionised water and a precision balance to measure the mass.

The expansion stability can be estimated by comparing the volumetric thermal expansion (in %, based on the original volume in the non-expanded state) of a sample at different temperatures.

3. Adhesion Tests

Adhesion was tested on the C-5 inventive composition on nylon and oil-covered hot-dip galvanized steel sheet substrates after expansion of the individual samples at 160° C. during 20 min, where the compositions were expanded in each case between two substrate sheets with a gap of 12 mm. The oil used for testing was Ferrocote® 61 MAL HCL (Quaker Chemical Corp, USA) which was applied on the steel sheets with an amount of 2 g/m² and 3 g/m², respectively. The values shown in the results table 5 give the percentage of cohesive failure. Values lower than 100 would indicate partial adhesive failure of the samples.

TABLE 5

Adhesion test results on nylon and oil-covered steel substrates.

| Substrate | Adhesion cohesive failure [%] |
|---|---|
| Nylon | 100 |
| Oil-covered hot-dip galvanized steel (2 g/m² oil) | 100 |
| Oil-covered hot-dip galvanized steel (3 g/m² oil) | 100 |

Of course the present invention is not limited to the examples described herein, which only illustrate the general principle of the present invention, or selected embodiments. A person of ordinary skill in the art would realise, however, that certain modifications would come within the teachings of the present invention. Therefore, the following claims should be studied to determine the true scope and content of the invention.

The invention claimed is:

1. A thermally expandable composition, consisting essentially of:
   (a) at least one epoxy-functional polymer EP, wherein:
      (i) the at least one epoxy-functional polymer EP is present in the composition before expansion in an amount of between 30 and 75 wt.-%, based on the total composition, and
      (ii) the at least one epoxy-functional polymer EP comprises at least 300 mmol epoxy groups per kg polymer EP,
   (b) a first thermoplastic polymer P1 having a melt flow index of between 100 and 200 g/10 min and a second thermoplastic polymer P2 having a melt flow index of between 0.1 and 60 g/10 min,
   (c) at least one chemical blowing agent B, wherein:
      (i) the at least one chemical blowing agent B is able to form at least one reaction product with at least two amino groups upon thermal decomposition, and
      (ii) the at least one chemical blowing agent B is present in the composition before expansion in an amount of between 12.2 and 25 wt.-%, based on the total composition,
   (d) optionally at least one activator A,
   (e) optionally at least one additive selected from the group consisting of stabilizers, antioxidants, fillers, colorants, tackifiers, dispersion aids, homogenizers, and adhesion promoters.

2. The thermally expandable composition according to claim 1, wherein said composition is free of anhydride, sulphur, or peroxide crosslinkers.

3. The thermally expandable composition according to claim 1, wherein the at least one epoxy-functional polymer EP is selected from the group consisting of glycidyl-methacrylate copolymers and epichlorohydrin-bisphenol copolymers.

4. The thermally expandable composition according to claim 1, wherein the at least one blowing agent B comprises azodicarbonamide.

5. The thermally expandable composition according to claim 1, wherein the at least one activator A comprises zinc oxide and/or an alkylated urea.

6. The thermally expandable composition according to claim 1, wherein the at least one chemical blowing agent B comprises a carbamate.

7. The thermally expandable composition according to claim 6, wherein the at least one chemical blowing agent B comprises Di-tert-butyl hexane-1,6-diyldicarbamate.

8. The thermally expandable composition according to claim 6, wherein the at least one activator A comprises citric acid.

9. The thermally expandable composition according to claim 1, consisting essentially of:
   the at least one epoxy-functional polymer EP in an amount of between 30 and 55 wt.-%, based on the total composition before expansion,
   the first thermoplastic polymer P1 and the second thermoplastic polymer P2 in a combined amount of between 15 and 40 wt.-%, based on the total composition before expansion,
   the at least one chemical blowing agent B in an amount of between 12.2 and 15 wt.-%, based on the total composition before expansion,
   the at least one activator A in an amount of between 2.5 and 10 wt.-%, based on the total composition before expansion.

10. A baffle and/or reinforcement element for hollow structures, wherein said element comprises a thermally expandable composition according to claim 1.

11. The baffle and/or reinforcement element of claim 10, wherein that said element comprises a carrier on which the thermally expandable composition is deposited or attached, wherein said carrier is made of a thermoplastic material.

12. A process for manufacturing a baffle and/or reinforcement element according to claim 11, wherein the thermally expandable composition is injection-moulded onto the carrier or co-extruded with the carrier.

13. A process for foaming a thermally expandable composition according to claim 1, wherein said thermally expandable composition is subjected to a temperature of between 150 and 220° C. for between 10 and 30 min.

14. A method for sealing, baffling, and/or reinforcing a cavity or hollow structure of a land-, water-, or air-vehicle, the method comprising (i) positioning the baffle and/or reinforcement element according to claim 10 in the cavity or hollow structure; and (ii) thermally expanding the thermally expandable composition.

15. The method according to claim 14, wherein the thermally expandable composition is thermally expanded such that said cavity or hollow structure is at least partially filled by the expanded composition.

16. The thermally expandable composition according to claim 1, wherein the least one activator A is present in an amount of from 6 to 10 wt.-%, based on the total composition before expansion.

17. The thermally expandable composition according to claim 1, wherein the composition is free of polymers or other compounds having primary amino groups.

18. The thermally expandable composition according to claim 1, wherein the at least one epoxy-functional polymer EP includes an epoxy-functional polymer EP1 having 5200 to 5500 mmol epoxy groups per kg polymer.

19. The thermally expandable composition according to claim 1, wherein the second thermoplastic polymer P2 has a melt flow index of between 0.1 and 10 g/10 min.

* * * * *